C. F. ASPLUND.
CREAM SEPARATOR SPEED INDICATOR.
APPLICATION FILED AUG. 23, 1915.
1,244,162.
Patented Oct. 23, 1917.
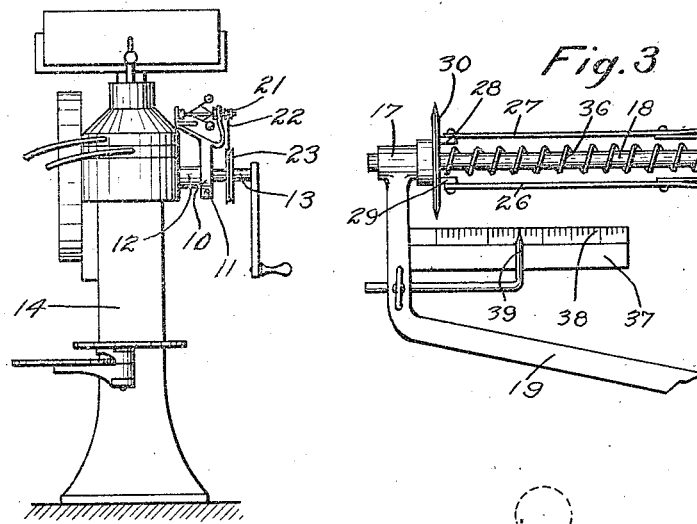
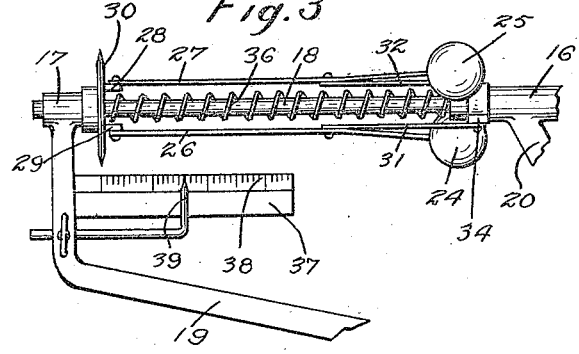
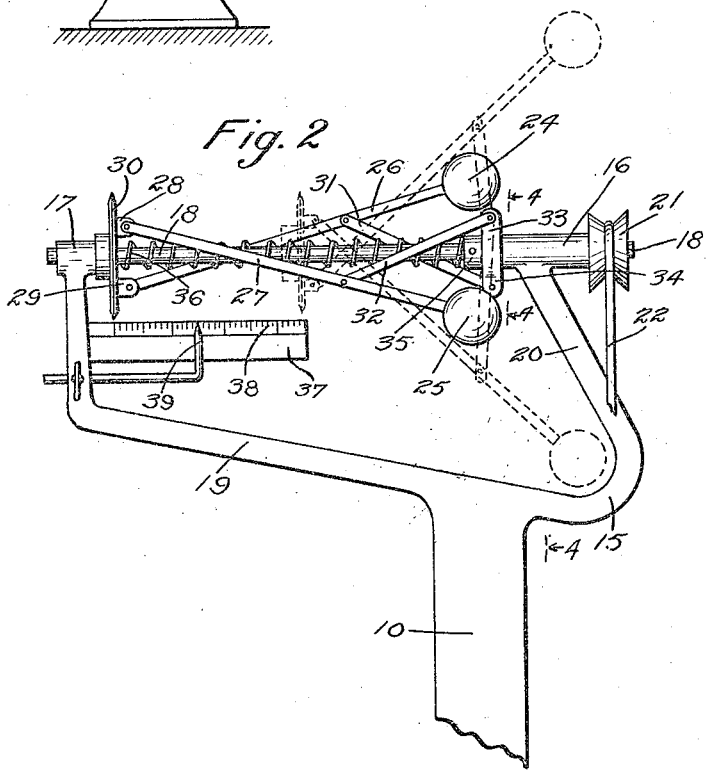
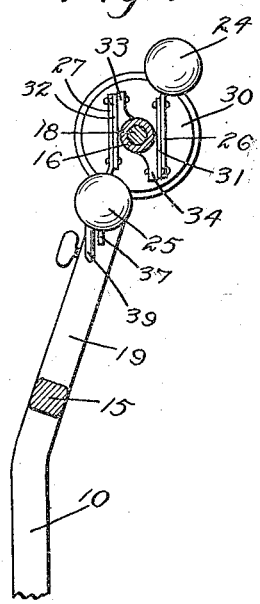
Witnesses:
Alex. Fagaard.
H. A. Bowman.
Inventor:
Charles F. Asplund.
By his Attorney.

UNITED STATES PATENT OFFICE.

CHARLES F. ASPLUND, OF MINNEAPOLIS, MINNESOTA.

CREAM-SEPARATOR SPEED-INDICATOR.

1,244,162. Specification of Letters Patent. Patented Oct. 23, 1917.

Application filed August 23, 1915. Serial No. 46,787.

*To all whom it may concern:*

Be it known that I, CHARLES F. ASPLUND, a citizen of the United States, residing at Minneapolis, in the county of Hennepin and State of Minnesota, have invented certain new and useful Improvements in Cream-Separator Speed-Indicators, of which the following is a specification.

My invention relates to cream separator speed indicators and has for its object to provide an improved speed indicator which may readily be attached to a cream separator and which will inform the operator when the cream separator is running at a correct speed.

The full objects and advantages of my invention will appear in connection with the detailed description thereof and are particularly pointed out in the claims.

In the drawings, illustrating the application of my invention in one form,

Figure 1 is an elevational view of a hand-operated cream separator showing my speed indicator attached. Fig. 2 is a front elevational view of the speed indicator drawn full size, and Fig. 3 is a view similar to Fig. 2 with the rotating element revolved ninety degrees. Fig. 4 is an end elevational section taken on line 4—4 of Fig. 2.

My speed indicator is shown connected to a hand-operated cream separator 14 in Fig. 1, though the same may be connected to any form of separator. A bracket 10 surrounds and is secured to the hub 12 of the drive shaft 13 of the cream separator 14 by means of a set-screw 11.

Bracket 10 terminates in a forked frame 15 having prongs 19 and 20 which provide bearings 16 and 17 for a light shaft 18, as best shown in Figs. 2, 3 and 4. Shaft 18 bears the speed indicator and is driven by a pulley 21 secured to it, which pulley is rotated by means of a belt 22 from a second pulley 23 attached to the drive shaft 13 of the cream separator 14.

The speed indicating member of my invention is of the centrifugal ball type and comprises the following parts: A pair of balls 24 and 25 are attached to the ends of a pair of long arms 26 and 27, the other ends of which arms are pivoted in lugs 28 and 29 protruding from the face of a disk 30 longitudinally slidable on shaft 18. Other shorter arms 31 and 32 are pivoted at one pair of ends to the arms 26 and 27 about one-third way from the balls 24 and 25 and at their other ends to lugs 33 and 34 on a casting 35 secured to shaft 18. Arms 31 and 32 may be about one-half as long as arms 26 and 27. It will be noted that the faces of lugs 28, 29 and 33, 34 are not diametrically opposite but said lugs are offset to cause the arms 26, 27 and 31, 32 to clear the shaft 18, as is quite necessary, due to the fact that said arms cross shaft 18, as clearly shown in Fig. 2. The disk 30 is forced away from the casting 35 by means of a compression spring 36 coiled about shaft 18, tending to keep the balls 24 and 25 near said shaft. As the shaft 18 is rotated the balls 24 and 25 are forced outward by centrifugal force and the disk 30 is advanced along said shaft, compressing spring 36. The extreme outward position of the balls 24 and 25 and the disk 30 are shown in dotted lines in Fig. 2.

Disk 30, as explained, is given longitudinal motion depending upon the speed of shaft 18, and said motion is used to indicate the speed of shaft 13. A scale 37, attached to prong 19, is placed below disk 30 and extends along shaft 18 a distance sufficient to include the extreme position of said disk 30, and is provided with a number of graduations 38 along its upper edge which correspond to the many positions of disk 30 along shaft 18, said graduations being correctly calibrated to indicate the speed of the shaft 13. A pointer 39 can be set to indicate any desired speed on scale 37 and is used as a guide in attaining said desired speed. In using my speed indicator the rotation of shaft 13 is positively accelerated until the disk 30 comes in line with pointer 39 and then said shaft is driven at a constant speed. If the disk 30 moves to the left or the right of pointer 39 the rotation of said shaft 13 must again be positively or negatively accelerated, as the case may be.

The proportion of arms 26, 27 and 31, 32 and their assemblage in relation to the other parts of the speed indicator render my speed indicator very sensitive. A small range of speed of shaft 13 produces a long range of motion of disk 30. Furthermore, I employ a very flexible spring 36, which permits of easy operation of the indicator and especially adapts it to cream separators, where the speed of the drive shaft is comparatively low. Though the indicator was shown and described applied to a cream separator, the same may also be utilized with other similar machines.

I claim:

1. A speed indicator for cream separators comprising a driven shaft, a member fixed on said shaft having arms extending in substantially diametrically opposite directions from the shaft, links pivoted to the sides of said arms so as to extend in parallel planes on each side of said shaft, weighted balls having arms extending substantially in the plane of and pivotally connected with said links at points between the balls and the other ends of the arms, and indicator mechanism to which said arms are connected, said indicator mechanism being rotatable with the shaft and movable along the same by the action of said balls.

2. A speed indicator for cream separators comprising a driven shaft, a collar secured on said shaft and having oppositely-disposed arms, a disk slidable on the shaft, weighted arms pivotally connected with the disk at opposite points and extending obliquely across the shaft on opposite sides thereof, a link for each weighted arm pivotally connected with said weighted arm and with one of said collar arms, said links extending in crossed relation obliquely across the shaft on opposite sides thereof, and a spring holding said disk in its outward and said weighted arms in their inward positions.

3. A speed indicator for cream separators comprising a driven shaft, a member fixed on said shaft having arms extending in substantially diametrically opposite directions from the shaft, links pivoted to the sides of said arms so as to extend in parallel planes on each side of said shaft, weighted balls having arms extending substantially in the plane of and pivotally connected with said links at points between the balls and the other ends of the arms, and a disk slidably mounted on the shaft and having pivotal connection with each of said arms at opposite sides of the shaft, said disk rotating with the shaft and presenting an indicating edge in any position of rotation thereof, said balls and link connections operating to slide the link under centrifugal action induced by speed of the balls.

4. A speed indicator for cream separators comprising a driven shaft, a member fixed on said shaft having arms extending in substantially diametrically opposite directions from the shaft, links pivoted to the sides of said arms so as to extend in parallel planes on each side of said shaft, weighted balls having arms extending substantially in the plane of and pivotally connected with said links at points between the balls and the other ends of the arms, a disk slidably mounted on the shaft and having pivotal connection with each of said arms at opposite sides of the shaft, said disk rotating with the shaft and presenting an indicating edge in any position of rotation thereof, said balls and link connections operating to slide the link under centrifugal action induced by speed of the balls, and a spring engaging the disk and determining the degree of centrifugal action required to slide the same.

In testimony whereof I affix my signature in presence of two witnesses.

CHARLES F. ASPLUND.

Witnesses:
F. A. WHITELEY,
A. M. ROYAL.

Copies of this patent may be obtained for five cents each, by addressing the "Commissioner of Patents, Washington, D. C."